United States Patent [19]

Kubo et al.

[11] Patent Number: 5,043,834
[45] Date of Patent: Aug. 27, 1991

[54] ACTUATOR LOCKING SYSTEM OF DISK UNIT

[75] Inventors: Masakazu Kubo, Atsugi; Yoshimi Masuda, Yokohama; Yuzo Nakagawa, Hiratsuka, all of Japan

[73] Assignee: International Business Machines Corporation, Armonk, N.Y.

[21] Appl. No.: 486,634

[22] Filed: Feb. 27, 1990

[30] Foreign Application Priority Data

Feb. 28, 1989 [JP] Japan .................. 1-45496

[51] Int. Cl.⁵ ................... G11B 5/54; G11B 21/12
[52] U.S. Cl. ...................... 360/105; 360/75; 360/137
[58] Field of Search ............ 360/105, 69, 75, 137, 360/97.01

[56] References Cited

U.S. PATENT DOCUMENTS

| | | | |
|---|---|---|---|
| 4,538,193 | 8/1985 | Dimmick et al. | 360/137 |
| 4,562,500 | 12/1985 | Bygdnes | 360/98.01 X |
| 4,647,997 | 3/1987 | Westwood | 360/105 |
| 4,833,550 | 5/1989 | Takizawa et al. | 360/75 |
| 4,864,444 | 9/1989 | Liu et al. | 360/105 |
| 4,903,157 | 2/1990 | Malek | 360/105 |

Primary Examiner—John H. Wolff
Attorney, Agent, or Firm—Richard E. Billion

[57] ABSTRACT

Disclosed is a disk drive which includes a disk, a spindle motor for rotating the disk, an actuator for moving a transducer over the disk, a pivotably mounted latch for locking the actuator, and a controller for rotating the spindle motor at at least two rates. The latch has two ends. On one end, the latch includes a locking member for engaging a notch in the actuator. On the other end of the latch is a vane for producing a force on the latch caused by the airflow from the rotating disk in the disk drive.

10 Claims, 4 Drawing Sheets

ACTUATOR LOCKING SYSTEM OF DISK UNIT

FIELD OF THE INVENTION

The present invention relates to a data storage unit, for example, a magnetic hard disk unit, and particularly to an actuator locking system which locks an actuator when a head attached to the actuator is positioned over a landing area of a disk when the head is not writing or reading data.

BACKGROUND OF THE INVENTION

In some data storage devices which have magnetic hard disks, an actuator locking system has been provided. The actuator locking systems prevent a loss of data written on the disk. Rather than landing the head in the data recording region and risking a loss of data, the head attached to the actuator, is moved and stopped over the landing area on a disk. Once positioned over the landing area, the actuator supporting the head is locked so that the head does not move to a position over the data recording area even when a shock or vibration is received from the outside.

U.S. Pat. No. 4,647,997 discloses an actuator locking system having a rotatable vane, a locking member (latch finger) coupled with the vane, and a spring attached to the vane. The rotatable vane, positioned relative to a predetermined axis, receives an air flow caused by the rotation of the disk. The spring biases the vane in the direction opposite the direction of the air flow. The locking member engages with the lock position of the actuator when the head is over the landing area of the disk and when the air flow is not strong enough to move the vane against the bias force of the spring. The locking member disengages from the lock position of the actuator when the air flow is strong enough to move the vane against the bias force of the spring. The actuator locking system disclosed in this patent has a data recording disk and an additional disk to assure production of a strong enough air flow which in turn assures the disengagement of the locking member from the actuator.

The actuator locking system disclosed in the above U.S. patent has a number of shortcomings. Among the shortcomings is that an additional disk for producing the air flow is needed along with the data recording disk. As a result, the thickness and weight of the disk unit will increase.

An object of the present invention is to provide an actuator locking system which can assuredly disengage a locking member from an actuator in the presence of the airflow produced by one disk. An additional and related object is that such a mechanism provided without increasing a thickness and weight of a disk unit.

SUMMARY OF THE INVENTION

In order to accomplish the above objects, the present invention includes motor revolution number switching and controlling means, which controls a spindle motor in a disk drive. For a predetermined amount of time after the disk unit is powered on, the motor revolution number switching and controlling means rotates the disks at an RPM which is higher than the number of RPM's at which a head writes or reads data from the disk. At the higher RPM, the air flow in the disk drive is increased to a point where the air flow striking the vane will disengage a locking member. As a result, a second disk need not be provided to produce increased air flow within the disk drive to positively disengage a locking member from the actuator of a disk drive.

BRIEF DESCRIPTION OF THE DRAWINGS

For a better understanding of the present invention, reference may be made to the accompanying drawings, in which.

These drawings are not intended as a definition of the invention but are provided solely for the purpose of illustrating the preferred embodiment of the invention described below.

DETAILED DESCRIPTION OF THE PREFERRED EMBODIMENT

Figure 1:
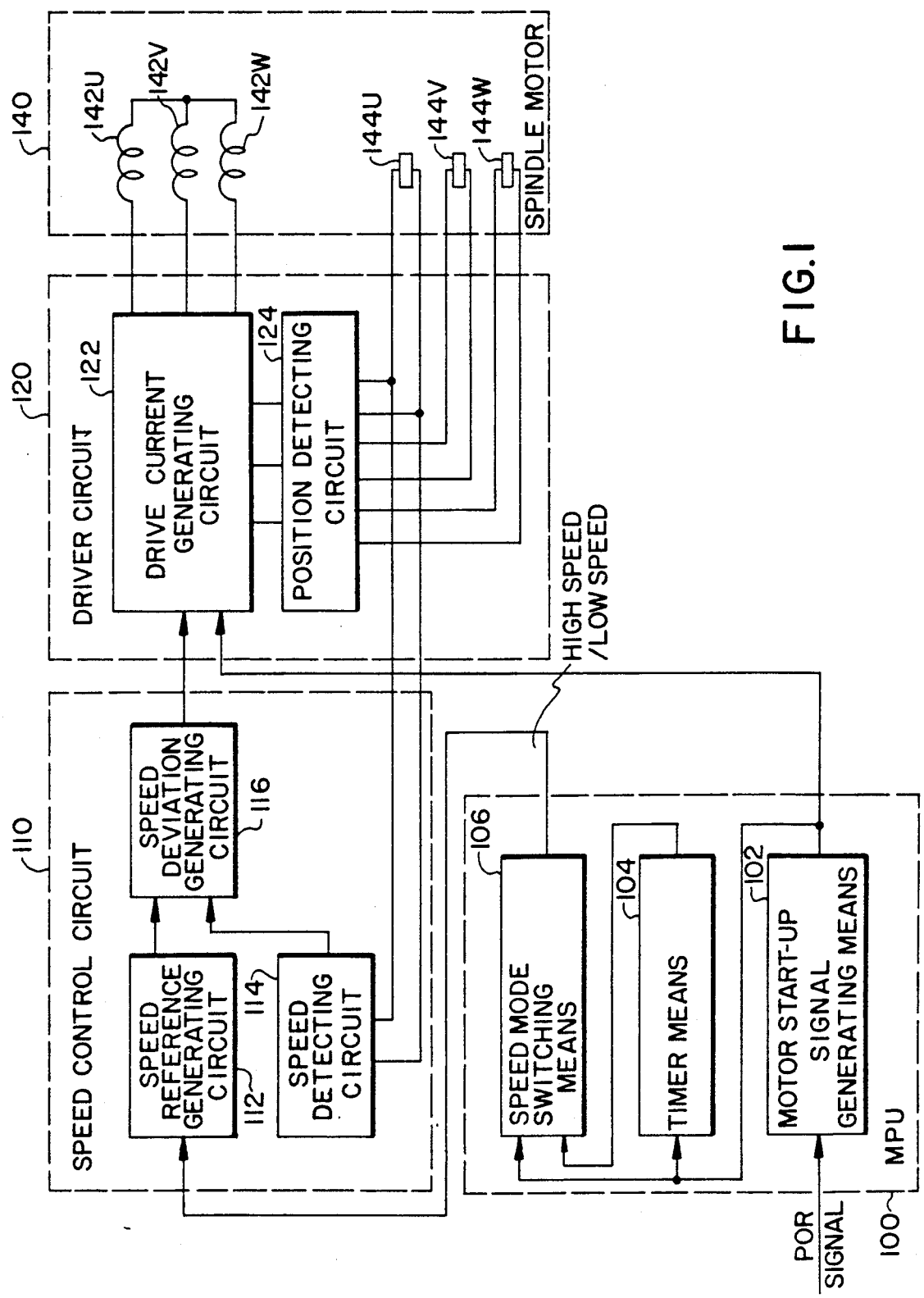
FIG. 1 is a block diagram showing a motor revolution number switching and controlling means of an actuator locking system according to the present invention.
Figure 2:
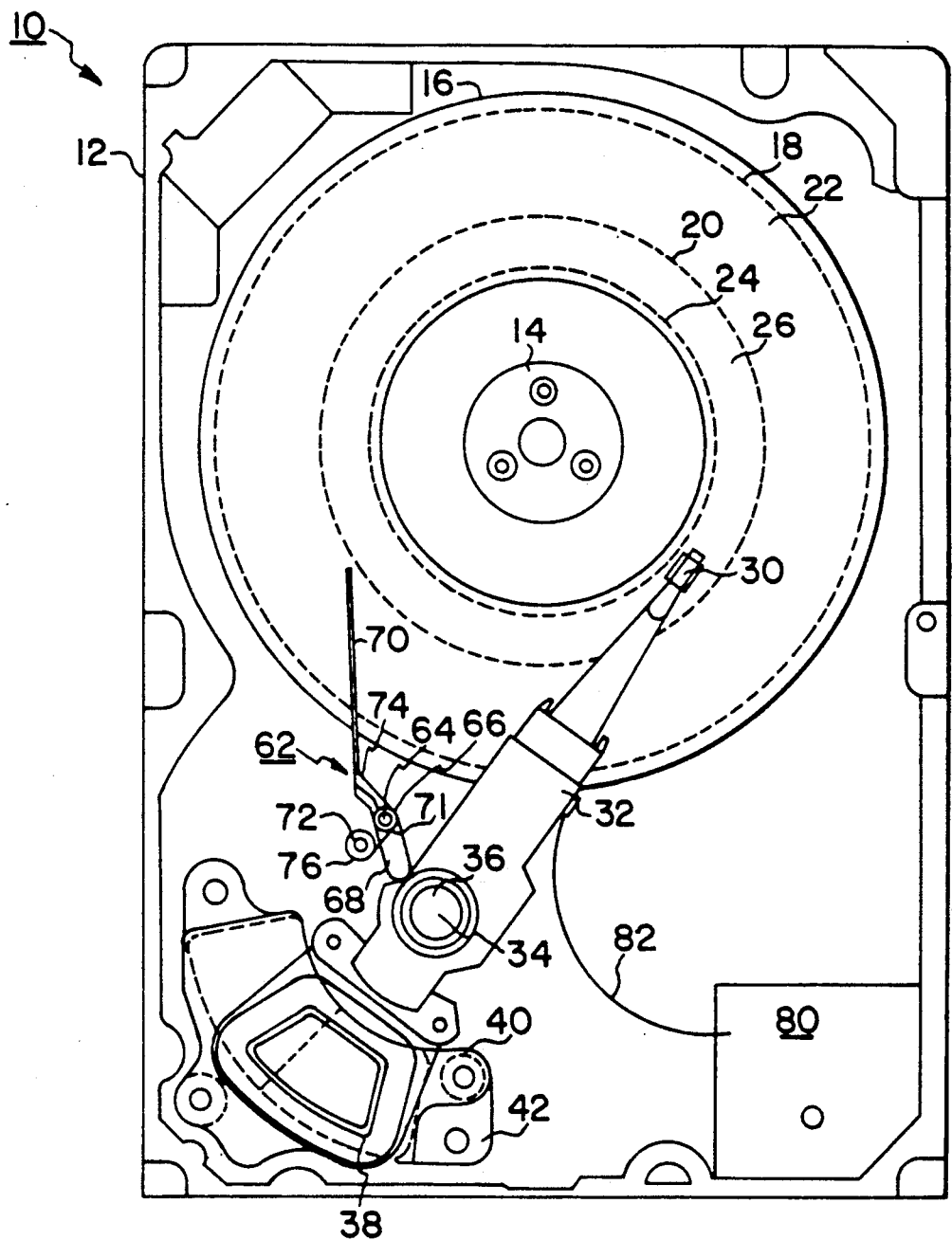
FIG. 2 is a plan view showing a magnetic hard disk unit with its actuator locked.
Figure 3:
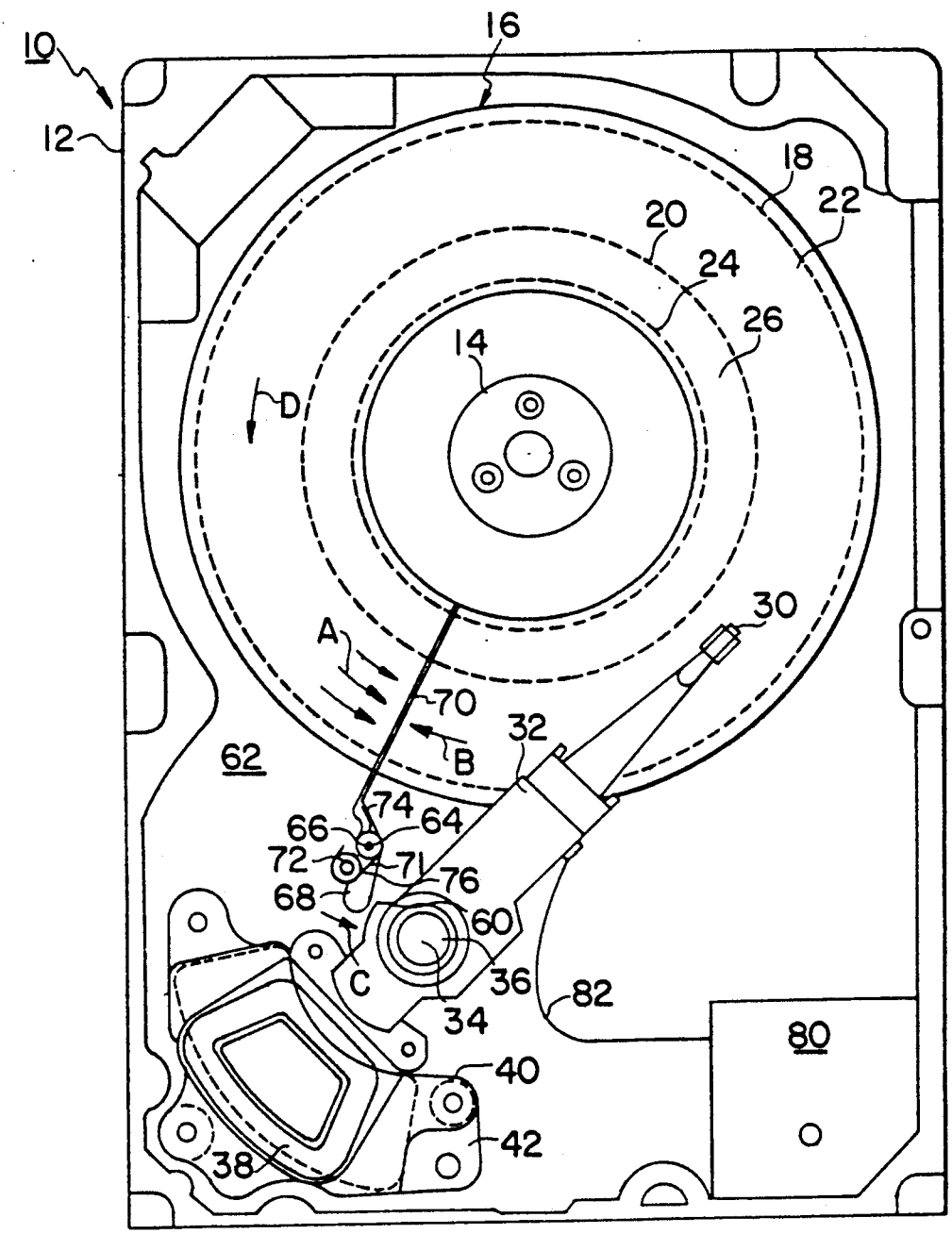
FIG. 3 is a plan view showing a magnetic hard disk unit with its actuator unlocked.

Referring first to FIGS. 2 and 3, a data storage unit such as magnetic hard disk unit 10 includes a base 12. Attached to the base 12 is a three-phase a.c. spindle motor 140 (refer to FIG. 1, not shown in FIG. 2 and FIG. 3). A magnetic rigid disk 16 is driven by the spindle motor 140 through a spindle 14. The disk 16 has a data recording area 22 between a concentric circle 18 and a concentric circle 20, and has a landing area 26 between a concentric circle 20 and a concentric circle 24 which are in the inside of the data recording area 22.

A magnetic head 30 for writing data onto the disk 16 or for reading out data from the disk 16 is attached to one end of an actuator 32. The actuator 32 is rotatably attached to a shaft 36 which is attached to the base 12. As a result, actuator 32 rotates about on axis 34. A coil 38 is fixed to an end portion of the actuator 32. The coil 38 is attached to the end opposite the head 30. Above the coil 38, an upper yolk 40 is fixed to the base 12 with a predetermined spacing from said coil 38. Under the coil 38, a lower yolk 42 is fixed to the base 12 with a predetermined spacing from said coil 38. On the sides of both the upper yolk 38 and the lower yolk 42 which are nearest the coil 38, permanent magnets (not shown) are fixed. The coil 38 and the permanent magnets constitute a voice coil motor. The voice coil motor produces a force when currents of varying amounts and direction flow in the coil 38 in the presence of the magnetic field produced by the permanent magnets. The forces produced move the actuator 32. The direction in which the actuator 32 moves depends on the polarity of the current flowing the coil 38.

A notch 60 is formed in the side of the actuator 32 of the disk 16 side. In the neighborhood of the notch 60, a latch 68? is provided which cooperates with the notch 60 to hold the head 30 supported by the actuator 32 over the landing area 26.

A shaft 66 is attached to the base 12. The latch 62 is rotatably mounted to the shaft 66. The latch 62 has a lock member 68 on one end of the latch 62, and has a vane 70 attached to the other end of the latch 62. The vane 70 receives an air flow of the direction of an arrow A caused by rotation of the disk 16 (refer to FIG. 3). That is, the locking member 68 and the vane 70 are integrally coupled. A coil spring 71 is provided in the outer periphery of the shaft 66. Near the shaft 66, a spring supporting column 72 is fixed to the base 12. The coil spring 74 has one end attached to the vane 70 and the other end 76 attached to the column 72 and biases the latch 62 in the direction B opposite to the direction A of the air flow from rotation of the disk 16 in the direction of arrow D (refer to FIG. 3).

Figure 4:
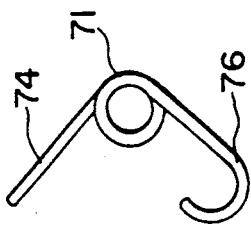
FIG. 4 is a plan view showing an example of a coil spring for use with an actuator locking system.

Reference is now made to FIG. 4 for a more detailed discussion of the coil spring 74. When, the rotation of the disk 16 either slows or stops, the air flow in the direction of arrow A impinging on the vane 70 no longer produces a force larger than the bias force of the spring 71. When the biasing force of the coil spring 71 is larger than the force of the wind on the vane 70, the locking member 68 swings in the direction of an arrow C and engages with or fits into the notch 60 of the actuator 32. The actuator 32 supports the head 30 positioned over the landing area 26 on disk 16 and is locked in that position.

Now, referring to FIG. 1, the motor revolution number switching and controlling means of the spindle motor 99 according to the present invention is described. The motor revolution number switching and controlling means 99 as shown in this figure comprises a microprocessor (MPU) 100, a speed control circuit 100, and a driver circuit 120 for controlling a spindle motor 140. The microprocessor 100 generates a motor start-up signal in response to a power-on reset (POR) signal generated by a power-on and outputs a high-speed mode signal or a low-speed mode signal. The speed control circuit 110 detects the actual speed of the spindle motor 140 and calculates a deviation from a speed reference signal specified by the high-speed or low-speed mode signal. The driver circuit 120 starts a current supply to drive the windings of the spindle motor 140 upon receipt of the motor start-up signal. The current supplied to drive the windings corresponds to the speed deviation between the high speed mode and the low speed mode signal and the reference signal. By varying the current the number of revolutions of the spindle motor 140 is matched to the number of revolutions indicated by the speed reference signal.

The MPU 100 includes a motor start-up signal generating means 102, a timer means 104, and a speed mode switching means 106. The motor start-up signal generating means 102 generates a motor start-up signal in response to the POR signal generated by the power-on. The timer means 104 outputs a set time elapse signal at a predetermined time, 4.5 sec. in this embodiment, after receipt of the motor start-up signal. The speed mode switching means 106 outputs the high-speed mode signal during the period of time from receipt of the motor start-up signal to receipt of the set time elapse signal, and outputs the low-speed mode signal after receipt of the set time elapse signal.

It will easily be understood by a person skilled in the art that the motor start-up signal generating means 102, the timer means 104 and the speed mode switching means 106 can be implemented by a combination of hardware and software of the MPU 100.

The speed indicated by the low-speed mode signal outputted by the speed mode switching means 106 is the number of revolutions of the spindle motor 140, 3600 RPM in this embodiment, at which the head 30 performs data reading or writing on the disk 16. The speed indicated by the high-speed mode signal outputted by the speed mode switching means 106 is the number of revolutions of the spindle motor 140 which causes an air flow due to the rotation of the disk 16 sufficient to move the vane 70 against the bias force of the coil spring 71 and to disengage the locking member 68 from the notch 60 of the actuator 32. In this particular embodiment high-speed mode signal brings the disk up to 4,200 RPM. If the spring force of the coil spring 76 becomes larger, it will be necessary to increase the speed indicated by the high-speed mode signal. In this embodiment, when the spindle motor 140 is rotated at 4,200 RPM, the locking member 68 is disengaged from the notch 60 even though the coil spring 71 has a spring constant of 1.2 gmm.

The high-speed mode signal outputted by the speed mode switching means 106 is a logical "1" signal or a high-level signal, and the low-speed mode signal is a logical "0" signal or a low-level signal.

The set time of the timer means 104 is the time required for the spindle motor 140 to rise to the number of revolutions indicated by the high-speed mode signal plus the time during which the spindle motor 140 rotates at the RPM indicated by the high-speed mode signal. In this embodiment, the rise time to the high-speed rotation is 4.0 sec., and the time for the rotation at the high-speed of 4,200 RPM is 0.5 sec.

The speed control circuit 110 includes a speed reference generating circuit 112, a speed detecting circuit 114, and a speed deviation generating circuit 116. The speed reference generating circuit 112 has a reference clock oscillator and a frequency divider which changes the frequency dividing ratio depending on the state of the output signal of the speed mode switching means 106. Simply put, the reference generating circuit 112 outputs a speed reference signal having a pulse train of the frequency indicating 4,200 RPM upon receipt of the high-speed mode signal. The speed reference generating circuit 112 outputs a speed reference signal consisting of a pulse train of the frequency indicating 3,600 RPM upon receipt of the low-speed mode signal. The speed detecting circuit 114 receives an output of a position sensor 144U which is one of three position sensors 144U, 144V and 144W provided correspondingly to the U-phase, V-phase and W-phase of the spindle motor 140, respectively. The position sensor 144U detects the rotational position of the motor 140 and detects the speed of the motor 140. The position sensor 144U periodically outputs a pulse in response to the rotation of the motor 140. The speed detecting circuit 114 can detect the speed of the motor 140 from the output of 144U. The speed detecting signal outputted from the speed detecting circuit 114 is a pulse train of the frequency which represents the actual speed of the motor 140. The speed deviation generating circuit 116 receives the speed reference signal and the speed detecting signal to output a voltage signal representing the difference in the frequency of both signals.

A driver circuit 120 includes a drive current generating circuit 122 and a position detecting circuit 124. The position detecting circuit 124 receives outputs from each of the position sensors 144U, 144V and 144W in the spindle motor 140. The output of the position sensors 144U, 144V is used to specify, via the drive current generating circuit 122, which winding current is to be supplied of three driving windings 142U, 142V and 142W, corresponding to the U-phase, V-phase and W-phase of the spindle motor 140, respectively. The drive current generating circuit 122 starts the current supply to the driving windings 142U, 142V and 142W upon receipt of the motor start-up signal. The drive current generating circuit 122 then supplies a current of the amount corresponding to the output signal of the speed deviation generating circuit 116 to the driving winding specified by the position detecting circuit 124.

The speed control circuit 110 and the driver circuit may be implemented through use of integrated circuits. For example, the speed control circuit 110 may be implemented with an integrated circuit TC9203 marketed by the Toshiba Corporation, and the driver circuit 120 may be implemented with an integrated circuit TA7736 marketed by the Toshiba Corporation.

Figure 5:
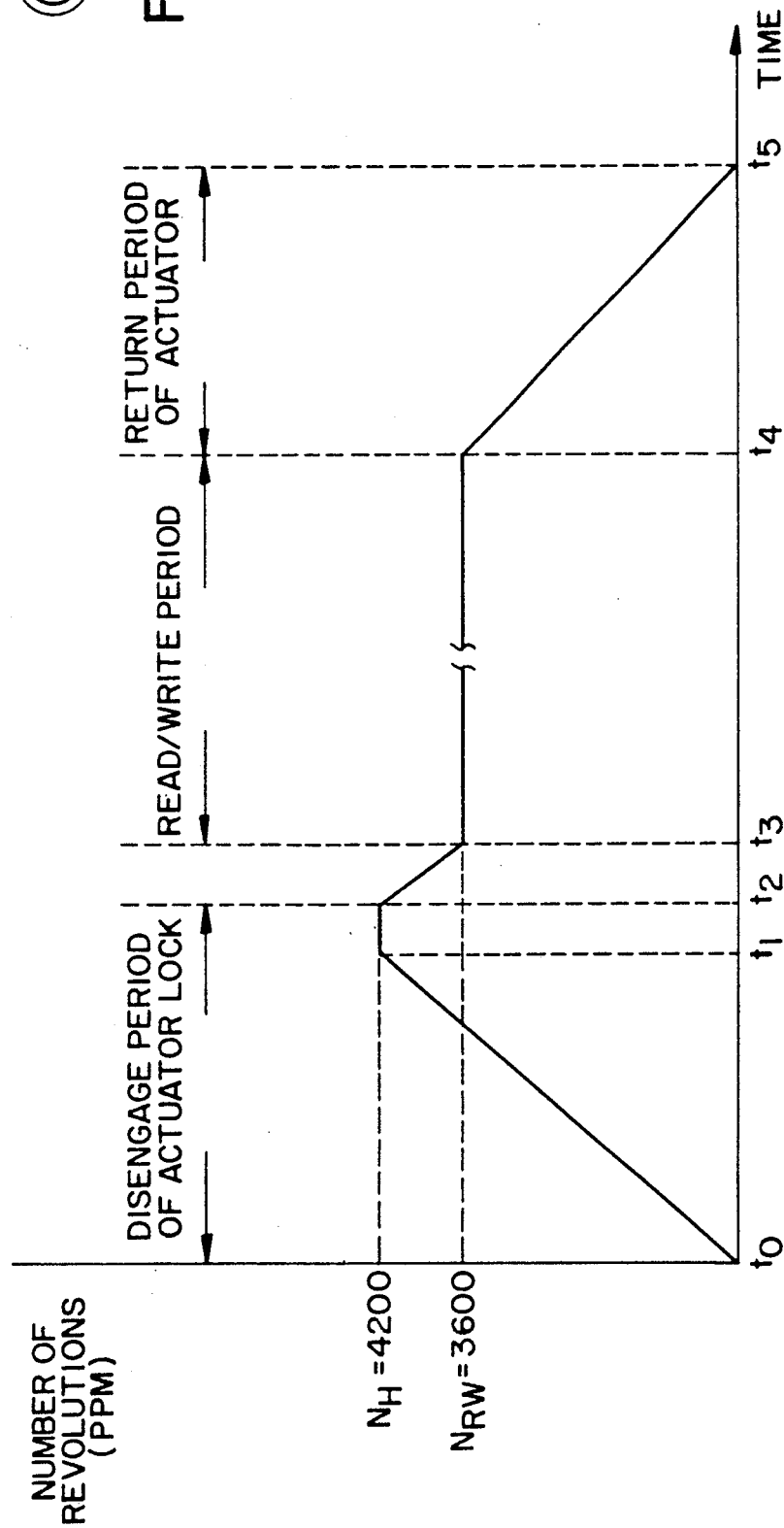
FIG. 5 is a graph showing a change with time of the revolutions of a spindle motor.

FIG. 5 shows a graph of the change in the number of revolutions per minute of the spindle motor 140 with respect to time. The change in number of revolutions per minute of the spindle motor 140 is controlled by the motor revolution number switching and controlling means 99 shown in FIG. 1. Now, assume that the power is off, and, as shown in FIG. 2, the locking member 68 is fitted into or engaged with the notch 60 thereby locking the actuator 32 in a position where the head 30 is held over the landing area 26. When the power is turned on at time $t_0$, the motor start-up signal generating means 102 outputs the motor start-up signal to the speed mode switching means 106 and the drive current generating circuit 122.

The speed mode switching means 106 outputs the high-speed mode signal to the speed reference generating circuit 112 upon receipt of the motor start-up signal. In response to this, the speed reference generating circuit 112 outputs a speed reference signal indicating the high number of revolutions $N_H$ or 4,200 RPM. At about the same time, the speed detecting circuit 114 outputs a speed detection signal indicating the number of revolutions per minute of the spindle motor 140 as 0 (namely, a halt state). The speed deviation generating circuit 116 outputs a voltage signal indicating the difference of the speed detection signal and the speed reference signal to the drive current generating circuit 122. In response to this, the drive current generating circuit 122 supplies a current to the driving windings so that the speed of the spindle motor 140 becomes $N_H=$ 4,200 RPM.

At time $t_1$, 4.0 sec. after time $t_0$, the spindle motor 140 rotates at $N_H=4,200$ RPM. The air flow in the direction of the arrow A caused by the rotation of the disk 16 at this high-speed produces a force on the vane 70 sufficient to push the vane 70, and allow the locking member 68 to swing and disengage from the notch 60 of the actuator 32. The actuator 32 is then free to move to various positions over the disk 16.

After the elapse of 4.5 sec. from time $t_0$, the timer means 104 outputs a set time elapse signal to the speed mode switching means 106. In response to this, the speed mode switching means 106 stops the output of the high-speed mode signal and begins to output the low-speed mode signal. The speed reference generating circuit 112, upon receipt of the low-speed mode signal, outputs a speed reference signal indicating the number of revolutions $N_{RW}=$ 3,600 RPM. Now, the speed detection signal outputted from the speed detecting circuit 114 indicates $N_H=4,200$ RPM, and the speed deviation generating circuit 116 outputs a voltage signal representing a deviation $(N_{RW}-N_H)$ to the drive current generating circuit 122. The drive current generating circuit 122 supplies a current to the driving windings 142U, 142V and 142W so that the speed of the spindle motor 140 slows to $N_{RW}=3,600$ RPM.

Thus, at time $t_3$, the number of revolutions of the spindle motor 140 becomes $N_{RW}$, enabling reading or writing by the head 30 attached to the activator 32. The air flow in the direction of the arrow A caused by the rotation of the disk 16 at the operating speed of 3600 RPM produces a force on the vane 70 sufficient to push the lock member 68 of latch 62 into contact with the spring supporting column 72. The spring supporting column 72 applies a force to the latch at the lock member 68 to produce a moment equal to the moment produced by the force on the vane 70.

When reading or writing has completed, the power is turned off at time $t_4$. In response to this, a switch (not shown) connects the actuator driving coil 38 with the spindle motor 140. The spindle motor 140 rotates by inertia for a while, producing a counter-electromotive force. This counter-electromotive force causes a current flow in the voice coil 38 which in turn causes the actuator 32 to move to the inner part of the disk 16. This allows the head supported on the end portion of the actuator 32 to move toward the landing area 26 of the disk 16.

Since the counter-electromotive force rapidly decreases as the rotation of the spindle motor 140 drops, the actuator 32 and the head 30 attached thereto may not reach the landing area 26 using only the counter-electromotive force. To assure that the head 30 reaches the landing area 26 a flexible cable 82 connected between an electric circuit board 80 fixed to the base 12 and the actuator 32, is arranged so it also biases the actuator 32 toward the landing area 26. When the spindle motor 140 is almost stopped, the air flow decreases and the force on the vane 70 weakens. As a result, the coil spring 76 applies a force to the latch 62 and causes the locking member 68 engage with the notch 60 of the actuator 32 (time $t_5$).

Although, in the above embodiment, the force of the coil spring 76 was set to be 0.6-1.2 gmm and the high-speed number of revolutions immediately after the power-on was assumed to be 4,200 RPM, the present invention is not intended to be restricted to these values. It should be noted that various numbers of revolutions may be selected depending on the force of the air flow on the vane 70 caused by the rotation of the disk 16 and depending on the magnitude of the force of the coil spring. It should also be noted that the force on the vane 70 caused by airflow depends on the surface area of the vane 70. The following table gives a representative sampling of how the force due to air flow can vary for a vane 70 with a fixed surface area. For the particular embodiment disclosed, the force of the air flow experienced by the vane 70 varied as follows depending on the number of revolutions of the disk 16. The following set coil spring forces allowed the locking member to disengage from the actuator at the various revolutions per minute.

| Force of Air Flow (Torque) | Initial Number of Revolutions | Set Coil Spring Force |
| --- | --- | --- |
| 1.7 gmm | 3800 RPM | 0.4-1.0 gmm |
| 1.8 gmm | 4000 RPM | 0.5-1.1 gmm |
| 1.95 gmm | 4200 RPM | 0.6-1.2 gmm |
| 2.08 gmm | 4400 RPM | 0.7-1.3 gmm |

Also note that although the speed mode switching means 106 and the timer 104 were implemented by the hardware and software of the MPU 100 in the above embodiment, separate electric circuits may be provided to serve the same purpose.

Also, the present invention is not limited to magnetic disks, but it may be applied to all disk units regardless of the type of the recording device, such as the magneto-optical and optical recording devices, as long as they are disk units in which the lock of the actuator is released by an air flow.

The present invention and the best mode for practicing it has been described. It is to be understood that the foregoing description is illustrative only and that other means and techniques can be employed without departing from the full scope of the invention described in the appended claims.

What we claim is:

1. An apparatus for storing data comprising:
   a housing;
   a disk mounted to said housing having a data recording region and a landing region;
   a spindle motor for rotating the disk within said housing, said rotating disk producing air flow within said housing;
   an actuator having a notch therein, said actuator pivotably mounted to said housing;
   a head attached to said actuator;
   a latch pivotably mounted within said housing, said latch having a first end and second end, said latch further comprising:
      a vane attached to one of said first and second ends;
      a locking member attached to the other of said first and second ends, said locking member engaging said notch to lock the actuator in a position so that the head is positioned over the landing region of the disk; and
      biasing means attached to said latch, said biasing means producing a moment on the latch acting in a direction to keep the locking member of the latch engaged with the notch of the actuator; and
   means for controlling the spindle motor to spin at a high-speed and to spin at an operating speed, where the spinning disk produces an air flow within the housing at said high speed which impinges on the vane and produces a moment on the latch greater than the moment on the latch from the biasing means and which disengages the locking member from the notch of the actuator.

2. The apparatus of claim 1 wherein the means for controlling the spindle motor spins the spindle motor at the high speed for a selected amount of time after said apparatus for storing data receives a power-on signal.

3. The apparatus of claim 2 wherein said means for controlling the spindle motor further comprises timer means for receiving a start-up signal of said motor generated in response to a power-on signal for the disk drive, said timer means generating an output signal after a selected time.

4. The apparatus of claim 3 wherein said means for controlling the spindle motor further comprises speed mode switching means for outputting a high-speed mode signal in response to receiving the start-up signal of said spindle motor and continuously outputting the high-speed mode signal until receiving the output signal of said timer means.

5. The apparatus of claim 4 wherein the speed mode switching means outputs a low-speed mode signal in response to receiving the output signal of said timer means.

6. The apparatus of claim 5 wherein said means for controlling the spindle motor further comprises speed control means for controlling said spindle motor, said speed control means spinning the spindle motor at a number of revolutions which is greater than the number of revolutions at which said head writes or reads data in the presence of said high-speed mode signal said speed control means spinning the spindle motor at the number of revolutions at which said head writes or reads data in the presence of the low-speed mode signal.

7. The apparatus of claim 1 wherein the means for controlling the spindle motor spins the disk at the operating speed which produces an airflow within the housing which impinges on the vane and produces a moment on the latch greater than the moment on the latch from said biasing means so that the locking member remains disengaged from the notch of the actuator.

8. The apparatus of claim 7 wherein the high speed is greater than the operating speed.

9. An apparatus for unlocking an actuator arm having a notch therein from a position over the landing portion of a disk upon initial start up of a disk drive unit, said apparatus comprising:
   a latch having a first end and a second end further comprising:
      a locking member which fits within the notch of the actuator arm, said locking member on one of said first or second ends of said latch;
      biasing means attached to said latch which produces a force which acts to maintain the locking member within the notch on the disk drive; and
      a vane attached to the other of said first or second ends of said latch, said vane producing a force which acts to remove the locking member from the notch on the actuator in response to air flow within the disk drive impinging on said vane; and
   means for controlling the air flow within the disk drive unit so that the force produced by the vane on the latch is greater than the force of the biasing means on the latch, said means for controlling the airflow producing a first rate of airflow which acts on the vane to disengage the locking member from the notch and a second rate of airflow which acts on the vane to keep the locking member disengaged from said notch.

10. A method for disengaging a pivotably mounted latch from a rotary actuator in a disk drive, said latch having a vane on one end and a locking member on the other end which fits within a notch in the rotary actuator, said vane producing a moment in the presence of air flow within the disk drive about an axis on which the pivotably mounted latch rotates in a direction which tends to disengage said locking member, the latch also having a spring attached thereto which produces a moment in a direction which tends to engage said locking member, said method for disengaging said latch comprising the steps of:
   rotating the disk within a disk drive at a first rate so that the air flow within the disk drive impinging on the vane produces a moment on the latch that disengages the locking member from the notch on the actuator; and
   rotating the disk within a disk drive at a second rate so that the air flow impinging on the vane produces a larger moment on the latch than the moment produced by the spring attached to the latch; to assure that the locking member remains disengaged from the notch on the actuator.

* * * * *